United States Patent
Zitzmann et al.

(10) Patent No.: US 8,168,258 B2
(45) Date of Patent: May 1, 2012

(54) METHOD OF PRODUCING A TEMPERATURE SENSOR

(76) Inventors: Heinrich Zitzmann, Lauf an der Pegnitz (DE); Gyoergy Bernitz, Nuremberg (DE)

( * ) Notice: Subject to any disclaimer, the term of this patent is extended or adjusted under 35 U.S.C. 154(b) by 572 days.

(21) Appl. No.: 12/375,700

(22) PCT Filed: Jul. 4, 2007

(86) PCT No.: PCT/EP2007/005918
§ 371 (c)(1), (2), (4) Date: Mar. 12, 2009

(87) PCT Pub. No.: WO2008/014866
PCT Pub. Date: Feb. 7, 2008

(65) Prior Publication Data
US 2009/0255825 A1    Oct. 15, 2009

(30) Foreign Application Priority Data
Aug. 2, 2006  (DE) .................. 10 2006 036 100

(51) Int. Cl.
*B05D 3/10* (2006.01)
*B05D 1/18* (2006.01)
*C25D 5/34* (2006.01)

(52) U.S. Cl. ............ 427/304; 427/437; 427/443.1; 427/435; 427/436; 205/216; 205/210

(58) Field of Classification Search .............. 427/304, 427/435, 436, 437
See application file for complete search history.

(56) References Cited

U.S. PATENT DOCUMENTS

| | | | |
|---|---|---|---|
| 4,082,908 A * | 4/1978 | Vanaglash, Jr. | 428/672 |
| 5,735,606 A | 4/1998 | Tani et al. | |
| 2003/0091093 A1 | 5/2003 | Zitzmann et al. | |
| 2004/0072413 A1 * | 4/2004 | Hashimoto et al. | 438/597 |

FOREIGN PATENT DOCUMENTS

| | | |
|---|---|---|
| DE | 289 127 A5 | 4/1991 |
| DE | 91 08 274 U1 | 10/1991 |
| DE | 41 07 142 A1 | 7/1992 |
| EP | 0 334 473 A2 | 2/1989 |
| JP | 57-211255 A | 12/1982 |
| JP | 01-283801 A | 11/1989 |
| JP | 03-263302 A | 11/1991 |
| JP | 2000-150754 A | 5/2000 |

OTHER PUBLICATIONS

Official Communication issued in International Patent Application No. PCT/EP2007/005918, mailed on Nov. 9, 2007.
Official Communication issued in corresponding Japanese Patent Application No. 2009-522124, mailed on Sep. 13, 2011.

* cited by examiner

*Primary Examiner* — Dah-Wei Yuan
*Assistant Examiner* — Nga Leung V Law
(74) *Attorney, Agent, or Firm* — Keating & Bennett, LLP

(57) ABSTRACT

In a method of producing a temperature sensor including at least one lead wire of a non-noble metal or of an alloy containing a non-noble metal, at first a lead wire is attached to the temperature sensor. An oxide layer is removed from at least one portion of the lead wire, and the at least one portion of the lead wire is chemically gilded immediately after removing the oxide layer.

3 Claims, 3 Drawing Sheets

METHOD OF PRODUCING A TEMPERATURE SENSOR

BACKGROUND OF THE INVENTION

The present invention relates to a method of producing a temperature sensor, in particular to a method in which lead wires of a non-noble metal and/or of alloys comprising a non-noble metal are used, the lead wires having at least partially been chemically gilded or gold-coated, e.g. by means of a currentless gold-plating method.

Temperature sensors in thin-film technology, such as platinum temperature sensors, have been produced in different designs and used for precise temperature measuring tasks for many years now.

A known temperature sensor is shown in FIG. 3, with FIG. 3(a) showing a cross-sectional illustration of the temperature sensor and FIG. 3(b) showing a top view illustration of the temperature sensor. A platinum film 102 of about 1 µm thickness is applied on an $AL_2O_3$ ceramic carrier 100. This platinum film 102 is structured such that it comprises a resistive trace of e.g. 100Ω. For protection of the platinum film 102, it is coated with a suitable protective layer 104. At two contact pads 106 shown in FIG. 3(b), lead wires 108 are welded on. So as to ensure sufficient mechanical stressability of the lead wires 108, as it is necessitated in the further processing of the sensor or in its employment, for example, a fixing glaze 110 by which the lead wires 108 undergo additional mechanical fixing is applied. The fixing glaze 110 is fired at temperatures of about 800° C. (the glaze has to melt) to ensure an operating temperature of up to 600° C., since the glaze is not allowed to soften during operation. For even higher operating temperatures, e.g. 800° C., correspondingly higher-melting glazes are employed.

Apart from the employment of platinum resistive traces, other metals may also be employed for the resistive trace. In the previously known designs of the temperature sensors described on the basis of FIG. 3, particularly due to the high firing temperature, either pure noble metal wires or wires of a noble metal alloy were used as lead wires, since these do not oxidize even at the higher process temperatures. Here, particularly platinum, palladium or silver are considered with respect to noble metal materials, and a gold-palladium alloy was used as noble metal alloy. Alternatively, also wires with sufficiently thick noble metal coating are used, whereby oxidation of the non-noble metal core may also be prevented at higher process temperatures, wherein a nickel wire having a platinum sheathing is used here, for example.

In further designs, as are described in DE 100 20 931 C1, for example, pure nickel wires without platinum sheathing, which have turned out to be specially inexpensive, are used as lead wires. However, a particular problem is to be taken into account here, arising due to the use of non-noble metals during the production of the temperature sensors. For example, if nickel wires are employed, the effect of the nickel chemically reacting with the fixing glaze mass of the fixing droplet occurs in the firing process of the fixing glaze droplet for wire fixing, when the melting phase is reached during the firing process. Due to this chemical reaction, many small bubbles in the wetting area to the wire surface develop in the glaze mass surrounding the lead wires at the contact pads of the sensor chip. These bubbles reduce the fixing quality, i.e. the maximum allowable tensile forces at the lead wires are decreased significantly thereby.

So as to take this problem into account, the fixing glaze is not applied immediately after attaching, e.g. by welding on, the lead wires in this method, but the applied nickel wires at first are oxidized in a further step after the attaching, in contrast to the above-described known sensors. Only then are the nickel wires, now provided with an oxide layer, provided with the fixing glaze at the contact pad in the usual manner, and is the same fused in a further firing process. The oxide layer, which has formed on the entire length of the nickel wire, then is removed in a further process step in the exposed wire area, i.e. the area not covered by the fixing mass, by way of a reduction process, e.g. in a $N_2/H_2$ atmosphere at about 600° C., since the oxide layer would be disturbing at this point for a further connection of the sensor to a measurement cable or another suitable connection site.

By way of the procedure just described, good fixing of even non-noble metal wires to a temperature measurement sensor or temperature sensor of the above-described type can be achieved.

Although it has been shown that the exposed wire ends can be tinned very well immediately after the reduction in the $N_2/H_2$ atmosphere, this complete or partial tinning of the exposed wire portions is not advantageous for all types of further processing. In fact, this tinning is advantageous for unproblematic further processing when soldering the sensors to a measurement cable or to another contact pad, but limits the operating temperature of the sensor to about 200° C., depending on the solder used. Furthermore, tinning also has to take place immediately after the reduction, since later oxidation of the lead wires would prevent tinning.

For applications at higher temperatures, a soft solder connection is not suited. In such cases of application, hard solder connections or weld connections are used for lead extension of the sensors, so that pre-tinning does not make sense in such a context. Although it would be the simplest solution to do without the tinning, it has been found, in connection with the reduction process, that it indeed leads to the oxygen being removed from the oxidized nickel surfaces, but accompanied by somewhat roughening the wire surface, which hereby again is very sensitive to renewed oxidation. In fact, such renewed oxidation also occurs even at moderate temperatures, e.g. during prolonged storage at room temperature, and particularly in the case of elevated humidity. In FIG. 3, the oxide layers on the lead wires 108 developing in the case of prolonged storage are designated with the reference numeral 112.

It is problematic in the above-described conventional sensors that different process steps are necessitated after completing the actual sensor, depending on the further use (soft soldering method or hard soldering method, welding). An additional process step may be needed also in the further processing, e.g. prior to the actual connecting, wherein the sensor is prepared for the desired contacting.

DE 91 08 274 U1 describes an infrared detector having a cylindrical housing consisting of a housing pot and a housing socket. A carrier plate of ceramics is held inside the housing by several plateau support pins, which are guided axially outward from the interior of the housing through the housing socket. These plateau support pins are formed as gilded contacting pins.

DE 41 07 142 A1 describes a method of producing a noble metal coating on a thin metal layer consisting of at least 70 wt.-% iron, cobalt and/or nickel and the crystallites thereof having a grain size of a maximum of 0.5 µm, wherein this metal layer is coated with a noble metal layer of 0.1 to 10 µm thickness in external-current-less or galvanic manner, wherein the non-noble metal layer is heated in the temperature range from 500° C. to 1300° C. in a non-oxidizing atmosphere prior to coating with the noble metal, until at least 30 area-% of the metal have a grain size of at least 2 µm or at least 50 area-% have a grain size of at least 1 μm. After cooling the non-noble metal layer, it is coated with the noble metal coating.

SUMMARY

According to an embodiment, a method of producing a temperature sensor having at least one lead wire of non-noble metal or of an alloy having a non-noble metal may have the steps of: attaching the lead wire to the temperature sensor; removing an oxide layer from at least one portion of the lead wire; and chemically gilding the at least one portion of the lead wire immediately after removing the oxide layer.

Advantageously, the temperature sensor includes at least two contact pads connected to the resistive trace and each having a lead wire attached.

The present invention is based on the finding that the problems due to the oxidation of the lead wires, as described above in connection with conventional approaches, can be avoided by chemically gilding the lead wires at least partly immediately after the reduction process by way of a currentless gold-plating method. The gold coating thus obtained on the non-noble lead wires offers excellent protection against the above-described oxidation tendency of the reduced lead wire. The gilded wires are uncritical for substantially all subsequent processes, since they allow for tinning, which is possibly desired later after a long intermediate storage time, on the one hand, and the gilded wires can be soldered, welded or crimped in excellent manner even after a long intermediate storage time, on the other hand.

In the method according to the invention, it is advantageous that the chemical gilding process takes place in "external-current-less" manner, i.e. without contacting the lead wires to a current source, such as would be necessitated in a galvanic method, for example.

As opposed to the above-described known approaches, the present invention is advantageous since the temperature sensors can be processed further in arbitrary manner due to the gilded lead wires, without necessitating further modification of the lead wires. On the one hand, the gold layer has good wettability for a desired tinning and/or for the solder material used for a soft solder connection, and the gold layer at the same time offers a good precondition for the above-described hard solder connections or weld connections.

According to an embodiment of the present invention, the step of gilding comprises immersing at least one portion of the lead wire in a plurality of baths, wherein the lead wire is immersed successively in a degreasing bath, in a rinsing bath I, in an activator bath, in a rinsing bath II, in the currentless gold-plating bath and in a rinsing bath III.

According to a further embodiment, all exposed portions of the lead wire are gilded, wherein the sensor is immersed completely or partially in the currentless gold-plating bath.

Advantageously, the non-noble metal is nickel, and the alloy is a nickel alloy.

According to a further embodiment, the method according to the invention comprises providing a temperature sensor chip having a resistive trace and a contact pad, attaching the lead wire to the temperature sensor, and removing an oxide layer formed on the lead wire at least from the portion of the lead wire to be gilded.

BRIEF DESCRIPTION OF THE DRAWINGS

Embodiments of the present invention will be detailed subsequently referring to the appended drawings, in which.

DETAILED DESCRIPTION OF THE INVENTION

On the basis of FIG. 1, now an embodiment of the production method according to the invention will be explained in greater detail. Assuming a temperature sensor, as described on the basis of FIG. 3, and the lead wire 108 of which was partly subjected to the reduction process to at least partly remove the oxide layer 112, as this is shown in step S100, the sensor at first is immersed in a degreasing bath in the step S102, and then in the rinsing bath I in the step S104. After rinsing or cleansing, the sensor is immersed in an activator bath in the step S106, and then in the rinsing bath II in the step S108. Then, the sensor is immersed in the currentless gold-plating bath in the step S110, followed by immersing in the rinsing bath III in step S112.

Figure 2A:
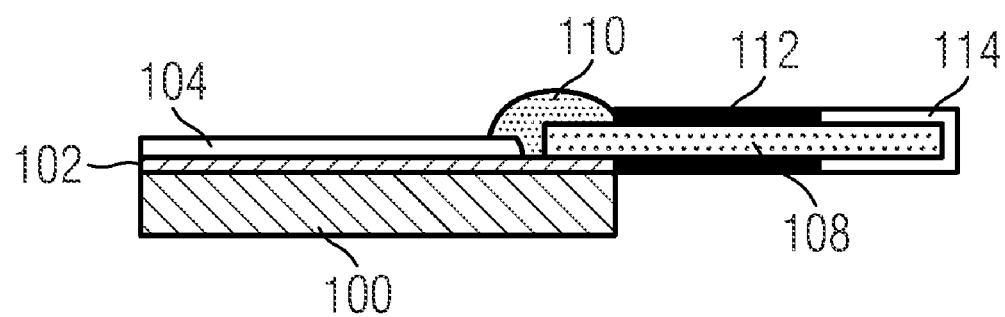
FIG. 2(a) is a cross-sectional illustration of a temperature sensor according to the invention.
Figure 2B:
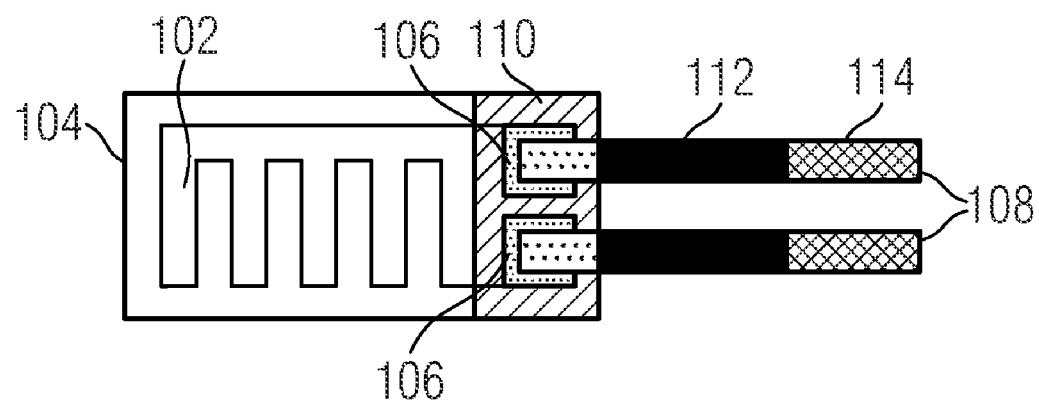
FIG. 2(b) is a cross-sectional illustration of the temperature sensor from FIG. 2(a)
Figure 3A:
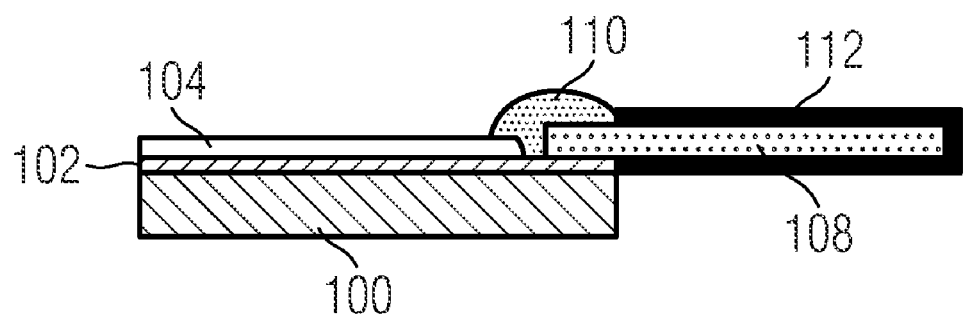
FIG. 3(a) is a cross-sectional illustration of a conventional temperature sensor.
Figure 3B:
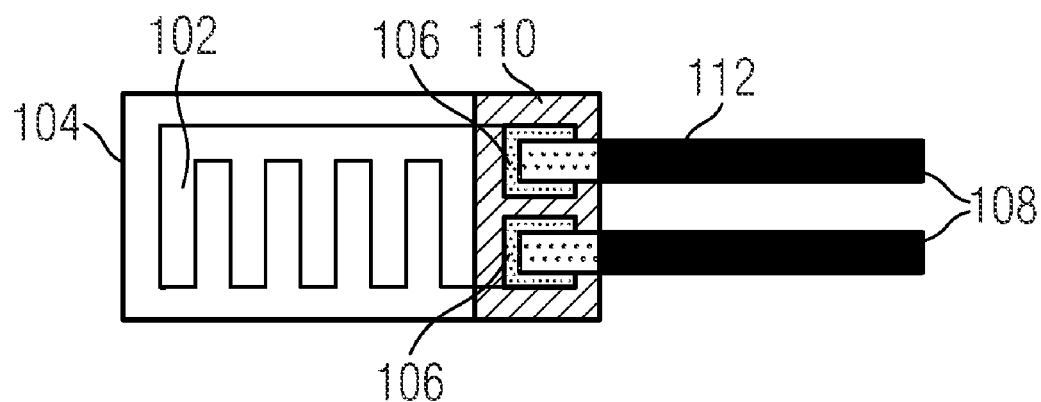
FIG. 3(b) is a cross-sectional illustration of the temperature sensor from FIG. 3(a).

Following step S112, the sensor has at least partly gilded lead wires, as this is shown in FIG. 2. In FIG. 2, the elements already described on the basis of FIG. 3 are provided with the same reference numerals. The oxygen has been removed from the oxide layer 112 in the area 114 by the reduction process, so that the nickel is exposed here, but with increased surface roughness, as described above. According to the invention, this area is gilded, as shown by the gold layer 114. As can be seen, renewed oxidizing of the lead wires in the area 114 is avoided by the inventive approach, so that the sensor produced in accordance with the invention can be processed further, particularly contacted, without further intermediate steps. Alternatively, also the entire exposed portion of the lead wires may be gilded. No oxide will later form at the gilded areas of the lead wires.

In the above-described process, the completed temperature sensors are completely immersed successively in the baths prescribed for the gilding process, using suitable carrier racks, and gold deposits on the nickel surface of the wires in the currentless gold-plating bath in this process. An exchange process takes place here, according to which the nickel atoms go into solution and gold atoms deposit. This process continues until a gold layer of about 0.1 μm thickness is achieved. In fact, the process continues until there is no more exchange of nickel atoms and gold atoms. Due to the specifics of the method, namely the exchange process between the non-noble metal and the noble metal, no gold deposits on the non-metal portions, i.e. on the carrier chip and the glaze. As mentioned above, the gold coating 114 of the nickel wires 108 thus obtained represents excellent protection against the oxidation tendency of the reduced nickel wires 108 mentioned, so that the gilded nickel wires can be soldered, welded or crimped in excellent manner even after a long intermediate storage time.

If it were desired to maintain a thicker gold layer for a later application, the same can be achieved by further suitable gilding methods, e.g. galvanic methods. For avoiding oxidation of the reduced nickel wire, however, the chemical gilding according to the invention basically is sufficient.

Even though the method has been described on the basis of a pure nickel wire, nickel alloys having admixtures of at least one other element, e.g. iron, also may be used.

The wire lengths to be gilded of the wires per sensor and/or per sensor/array may basically be chosen arbitrarily, depending on the application, so that wire lengths of about 2 mm to 200 mm are possible, for example. The number of contacts per sensor/array also is not limited to 2. Rather, any number (e.g. several hundreds) of contacts per sensor/array may be provided. Likewise, the raster sequence, i.e. the distance of the individual contacts, may be chosen arbitrarily. The wire diameter also may vary within a wide range, wherein typically a wire diameter between 0.1 mm to 0.5 mm is chosen.

If the wires are immersed in the gold-plating bath only to a partial extent of the entire wire length, only the immersed wire length is gilded, whereby the partial gilding of the wire shown in FIG. 2 also can be achieved.

According to an embodiment of the present invention, the various above-explained baths of the production process are chosen as follows with respect to their composition and the immersing time of the sensors.

In the currentless gold-plating process for the external-current-less, i.e. chemical gilding, certain process parameters during the process flow generally are to be met (order of the baths, bath composition, bath temperatures, dwelling time, etc.).

Figure 1:
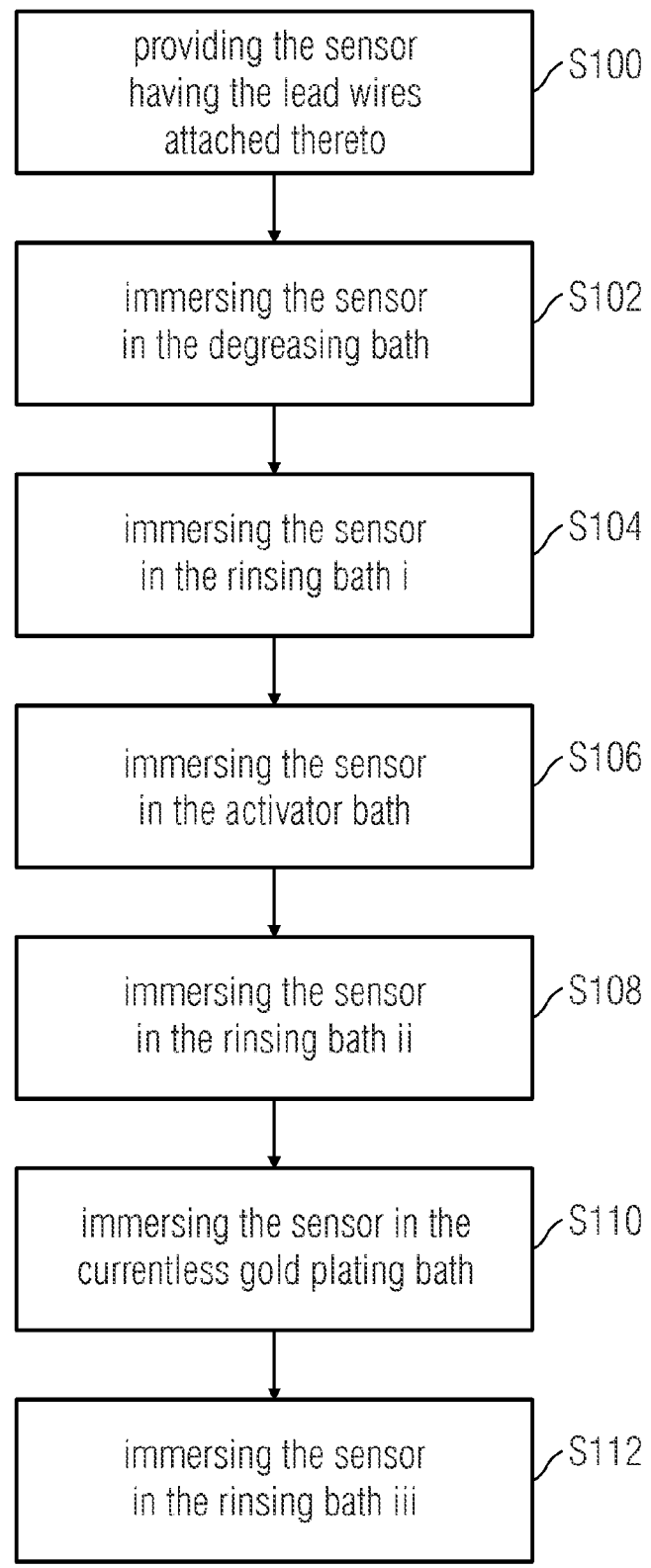
FIG. 1 is a flowchart of the inventive method according to an embodiment.

According to the embodiment, the order is chosen in accordance with the flowchart of FIG. 1. Advantageously, the composition of the different baths is as follows:

| | |
|---|---|
| degreasing bath: | salt mixture With sodium hydroxide, |
| activator bath: | salt mixture with ammonium hydrogen difluoride, |
| currentless gold-plating bath: | electrolyte with potassium gold cYanide, and |
| rinsing baths I-III: | desalted water |

Advantageously, the following bath temperatures and dwelling times are chosen:

| | |
|---|---|
| degreasing bath: | 50° C./about 5 min |
| activator bath: | room temperature/about 1.5 min, |
| currentless gold-plating bath: | 70° C./about 20 min, and |
| rinsing baths I-III: | room temperature/1 to 2 min. |

Even though the embodiments of the present invention have been described on the basis of a platinum temperature sensor with contact pads and nickel wires, it is to be pointed out that the inventive approach also can be used for temperature sensors in which materials other than platinum are employed for the resistive trace. The use of two lead wires also is not mandatory, more than two lead wires or even only one lead wire may be used instead, as mentioned above, depending on the contacting conditions of the temperature measurement sensor. Furthermore, it was described above, on the basis of the embodiment, that a temperature sensor is immersed in the different baths successively, but a plurality of sensors are set into a carrier at the same time or may be immersed in the baths even prior to the dicing thereof.

Furthermore, instead of the nickel wires and/or nickel alloy wires described, other suitable non-noble metals or alloys may be used.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method of producing a temperature sensor comprising at least one lead wire made of nickel or a nickel alloy, the method comprising:
   attaching the lead wire to the temperature sensor;
   removing an oxide layer from at least one portion of the lead wire such that the nickel or the nickel alloy is exposed at the at least one portion of the lead wire; and
   chemically gilding the at least one portion of the lead wire after removing the oxide layer; wherein
   the step of chemically gilding comprises immersing the at least one portion of the lead wire in a plurality of baths; and
   the at least one portion of the lead wire is immersed successively in a degreasing bath, in a first rinsing bath, in an activator bath, in a second rinsing bath, in a currentless gold-plating bath until a gold layer of about 0.1 μm is formed thereon, and in a third rinsing bath.

2. The method according to claim 1, wherein all portions of the lead wire from which the oxide layer has been removed are gilded.

3. The method according to claim 2, wherein the temperature sensor is partially or completely immersed in the currentless gold-plating bath.

* * * * *